(12) United States Patent
Fan

(10) Patent No.: US 12,468,984 B1
(45) Date of Patent: Nov. 11, 2025

(54) ANALOG AI COMPUTING ARCHITECTURE

(71) Applicant: AIChipSky Microelectronics Co., Ltd., Chengdu (CN)

(72) Inventor: Tingting Fan, Chengdu (CN)

(73) Assignee: AIChipSky Microelectronics Co., Ltd., Chengdu (CN)

( * ) Notice: Subject to any disclaimer, the term of this patent is extended or adjusted under 35 U.S.C. 154(b) by 0 days.

(21) Appl. No.: 19/203,278

(22) Filed: May 9, 2025

(30) Foreign Application Priority Data

May 13, 2024 (CN) .......................... 202410590038.2

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 2010/0197259 A1 | 8/2010 | Chen | |
| 2021/0027200 A1* | 1/2021 | Zuo | ...................... H01L 25/0655 |
| 2022/0092246 A1* | 3/2022 | Abbas | ..................... G06F 30/367 |

FOREIGN PATENT DOCUMENTS

| | | |
|---|---|---|
| CN | 104092442 B | 10/2014 |
| CN | 112350729 B | 2/2021 |
| CN | 112485697 A | 3/2021 |
| CN | 114362754 B | 4/2022 |
| CN | 117353744 A | 1/2024 |

OTHER PUBLICATIONS

Zhu haiyang, Design of a multi-purpose data acquisition system basedon an intelligent car, Journal of Jining Normal University, Issue 05, Sep. 20, 2016 (Sep. 20, 2016).

Zhang Yuxiao, Zheng Dezhi, Fan Shangchun, signal processing method and realization of vortex flow meter, Issue 12, Dec. 15, 2008 (Dec. 15, 2008).

* cited by examiner

*Primary Examiner* — Dave Misir
(74) *Attorney, Agent, or Firm* — Birchwood IP

(57) ABSTRACT

The present invention provides an analog AI computing architecture, and relates to the technical field of circuit design. The architecture includes: a signal obtaining module, configured to sample an analog signal to obtain signal sample data; a filtering module, configured to perform bandpass filtering on the signal sample data by an AI signal transmission mechanism to obtain filtered data; and a computing module, configured to compute the filtered data by an arithmetic unit and an external control switch to obtain a processed analog signal. The present invention simplifies the processing flow of traditional digital signals, improves the computing speed, and reduces the power consumption and system complexity required for computing.

2 Claims, 2 Drawing Sheets

ANALOG AI COMPUTING ARCHITECTURE

CROSS-REFERENCE TO RELATED APPLICATIONS

This application claims priority to Chinese Patent Application No. 202410590038.2, filed on May 13, 2024, which is hereby incorporated by reference in its entirety.

TECHNICAL FIELD

This specification relates to the field of circuit design technology, and in particular, to an analog AI computing architecture.

BACKGROUND

According to traditional digital signal processing, an analog signal is processed by a digital circuit after being subjected to a series of conversion steps. These steps include analog signal acquisition by an A/D converter, digital signal filtering by an FIR filter, some preprocessing by FPGA, such as noise removal, signal amplification or signal reduction, and more complex analysis and processing by an ARM processor or a dedicated DSP chip. The specific process is shown in FIG. 1. After a series of processing, the final result is output.

Although the analog signal is efficiently processed, this method also has some disadvantages and limitations. Firstly, digital signal processing requires a large number of devices for support, which results in a large number of devices required for the entire system, increasing the complexity and cost of the system, and requiring a large amount of time for optimization and debugging of the algorithm.

Secondly, since the conversion of signals between the analog domains and digital domains may introduce errors, there may be a loss of precision in the processing. Further, since an analog signal needs to be converted into a digital signal and then the processing result is converted back to the analog signal for output, additional processing delay may be introduced in this process, which affects the real-time performance and response speed of the system.

SUMMARY

Aiming at the defects in the prior art, the present invention provides an analog AI computing architecture, which simplifies the processing flow of traditional digital signals, improves the computing speed, and reduces the power consumption and system complexity required for computing.

To achieve the above objective, the present invention adopts the following technical solutions. An analog AI computing architecture includes:
- a signal obtaining module, configured to sample an analog signal to obtain signal sample data;
- a filtering module, configured to perform bandpass filtering on the signal sample data by an AI signal transmission mechanism to obtain filtered data; and
- a computing module, configured to compute the filtered data by an arithmetic unit and an external control switch to obtain a processed analog signal.

Further, the signal obtaining module includes a sample-and-hold circuit composed of a fully differential operational amplifier and a sampling capacitor:
- the fully differential operational amplifier is configured to sample an input analog signal and store an obtained sample charge in the sampling capacitor; and
- the sampling capacitor is configured to perform form conversion on the sample charge to obtain signal sample data.

Further, an expression of the sample charge is:

$$q_{S1}(\phi_1) = C_S \cdot V_{in1}(\phi_1);$$

$$q_{S2}(\phi_1) = C_S \cdot V_{in2}(\phi_1);$$

wherein $q_{S1}$ represents a first sample charge, $C_S$ represents a sampling capacitance, $V_{in1}$ represents an input first analog signal, $\phi_1$ represents a control clock, $q_{S2}$ represents a second sample charge, and $V_{in2}$ represents an input second analog signal.

Further, an expression of the signal sample data is:

$$V_{S1}(t) = \frac{q_{S1}(\phi_1)}{C_S} = V_{in1}(\phi_1);$$

$$V_{S2}(t) = \frac{q_{S2}(\phi_1)}{C_S} = V_{in2}(\phi_1);$$

wherein $V_{S1}$ represents first signal sample data, $q_{S1}$ represents a first sample charge, $C_S$ represents a sampling capacitance, $V_{in1}$ represents an input first analog signal, $\phi_1$ represents a control clock, t represents a sampling period, $V_{S2}$ represents second signal sample data, $q_{S2}$ represents a second sample charge, and $V_{in2}$ represents an input second analog signal.

Further, the filtering module includes a bandpass filter composed of a transconductance amplifier and a capacitor;
- the filtering module is configured to perform bandpass filtering processing of a continuous time domain on the signal sample data by the bandpass filter to obtain filtered data:

$$V_{out1}(t) = G_m \cdot \frac{1}{C} \cdot \int_0^t V_{S1}(\tau) d\tau;$$

$$V_{out2}(t) = G_m \cdot \frac{1}{C} \cdot \int_0^t V_{S2}(\tau) d\tau;$$

wherein $V_{out1}$ represents first filtered data, $G_m$ represents an amplification factor of the transconductance amplifier, C represents a capacitance value in the bandpass filter, $V_{S1}$ represents first signal sample data, $\tau$ represents a current moment, t represents a sampling period, $V_{out2}$ represents second filtered data, and $V_{S2}$ represents second signal sample data.

Further, the computing module includes an arithmetic unit and a control switch array:
- the control switch array is configured to analyze the filtered data and input the filtered data into a corresponding operational amplifier for operation by an external control switch; and
- the arithmetic unit is configured to calculate the filtered data to obtain a processed analog signal.

The present invention has the beneficial effects as follows: the analog AI computing architecture consists of a signal obtaining module, a filtering module and a computing module, and a processed analog signal is obtained by sampling, filtering and analog AI computation on the analog signal. Through highly parallel and analog processing, the more complex processing in the digital signal processing field may be transformed into a result of direct processing in a simpler analog domain, which reduces the distortion and delay that may occur in the signal conversion process, and improves the real-time performance and response speed of the system. The digital signal processor and other related digital circuits are omitted, and the high-energy-efficiency process of neurons transmitting signals through synapses in the human brain is referenced, which simplifies the system architecture and reduces power consumption.

BRIEF DESCRIPTION OF DRAWINGS

This specification is further explained by means of exemplary embodiments, which are described in detail by the accompanying drawings. These embodiments are not limiting. In these embodiments, the same reference numerals represent the same structure, wherein.

DETAILED DESCRIPTION OF EMBODIMENTS

The following description of the specific embodiments of the present invention is provided to facilitate the understanding of the present invention by those skilled in the art. However, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

EMBODIMENT

Figure 1:
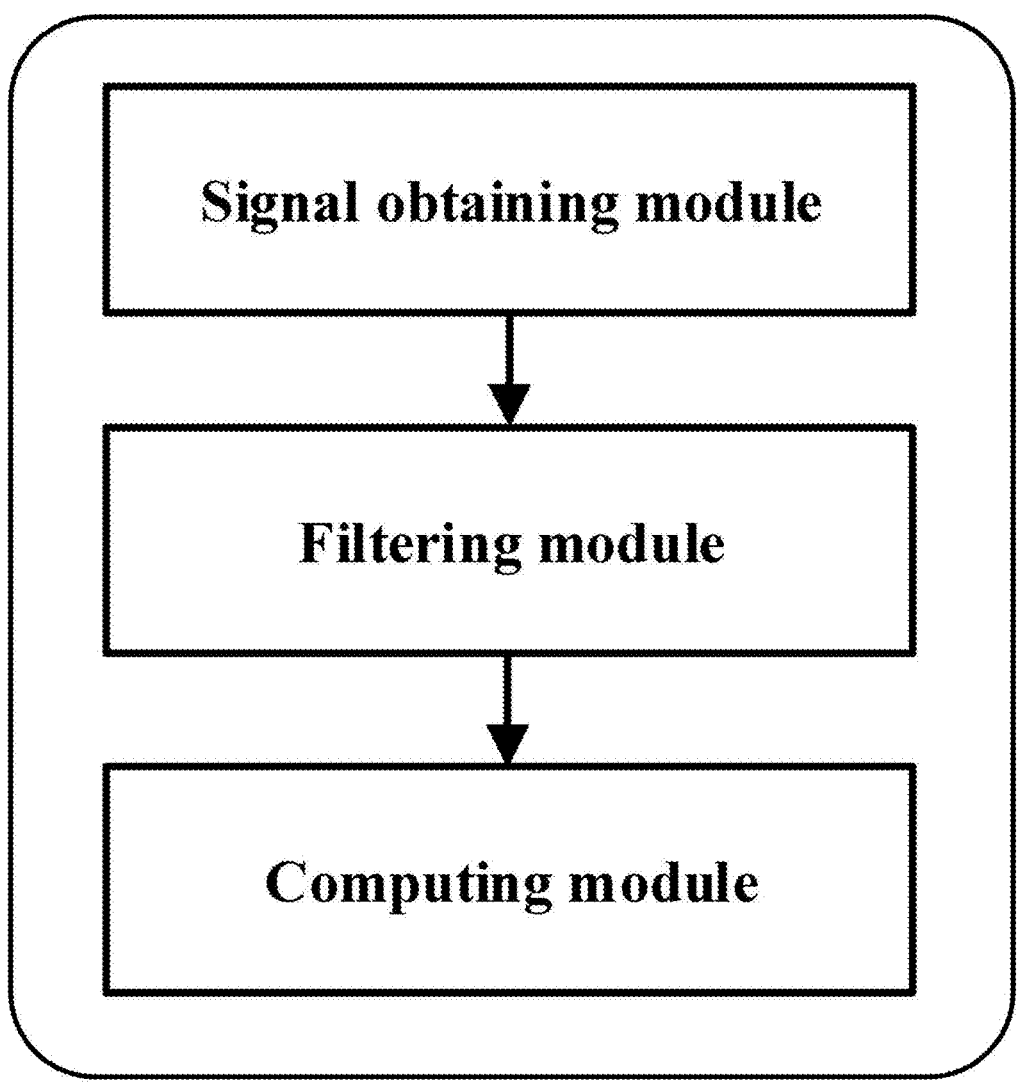
FIG. 1 is a schematic diagram of a module of an analog AI computing architecture according to some embodiments of this specification.

FIG. 1 is a schematic diagram of a module of an analog AI computing architecture according to some embodiments of this specification.

In some embodiments, the analog AI computing architecture may include a signal obtaining module, a filtering module, and a computing module.

The signal obtaining module is configured to sample an analog signal to obtain signal sample data.

The analog signal is a signal that reflects the continuous change of current and voltage over time. For example, the analog signal may include a first analog signal and a second analog signal, which reflect current signals and voltage signals input into the circuit.

The first analog signal is an analog signal obtained from a first input terminal.

The second analog signal is an analog signal obtained from a second input terminal.

The signal sample data is a target frequency interval signal at each time point divided by time period.

In some embodiments, the signal obtaining module includes a sample-and-hold circuit composed of a fully differential operational amplifier and a sampling capacitor, and is configured to sample an analog signal to obtain signal sample data.

The fully differential operational amplifier is configured to sample an input analog signal and store an obtained sample charge in the sampling capacitor.

The sample charge is the charge-form data that reflects signal voltage values at time points. For example, the sample charge may include a first sample charge, a second sample charge, and the like.

The first sample charge is charge data obtained by sampling the first analog signal.

The second sample charge is charge data obtained by sampling the second analog signal.

In some embodiments, an expression of the sample charge may be:

$$q_{S1}(\phi_1) = C_S \cdot V_{in1}(\phi_1);$$

$$q_{S2}(\phi_1) = C_S \cdot V_{in2}(\phi_1);$$

wherein $q_{S1}$ represents a first sample charge, $C_S$ represents a sampling capacitance, $V_{in1}$ represents an input first analog signal, $\phi_1$ represents a control clock, $q_{S2}$ represents a second sample charge, and $V_{in2}$ represents an input second analog signal.

The sampling capacitor is configured to perform form conversion on the sample charge to obtain signal sample data.

In some embodiments, an expression of the signal sample data may be:

$$V_{S1}(t) = \frac{q_{S1}(\phi_1)}{C_S} = V_{in1}(\phi_1);$$

$$V_{S2}(t) = \frac{q_{S2}(\phi_1)}{C_S} = V_{in2}(\phi_1);$$

wherein $V_{S1}$ represents first signal sample data, $q_{S1}$ represents a first sample charge, $C_S$ represents a sampling capacitance, $V_{in1}$ represents an input first analog signal, $\phi_1$ represents a control clock, t represents a sampling period, $V_{S2}$ represents second signal sample data, $q_{S2}$ represents a second sample charge, and $V_{in2}$ represents an input second analog signal.

The first signal sample data is voltage form data after the first sample charge conversion.

The second signal sample data is voltage form data after the second sample charge conversion.

In some embodiments, the signal obtaining module may sample an input analog signal by using a capacitor inversion sample-and-hold circuit to obtain a sample charge. In a hold stage, the sample charges $q_{S1}$ and $q_{S2}$ remain unchanged, and a charge value is converted back to a voltage form through the sampling capacitance $C_S$, so as to perform a next filtering process until a next sampling period. In the holding process, the signal is still an analog voltage signal, but the value of the signal is the holding of the voltage at a sampling moment and does not change with the time.

In some embodiments, the signal obtaining module may include an integrating sample-and-hold circuit that operates over a wider frequency range; a switched-capacitor sample-and-hold circuit that switches capacitors by external control signals with switched capacitor technology to achieve sample-and-hold functions; a time-interleaved sample-and-hold circuit that samples a plurality of signals with time-interleaved technology and is suitable for a multi-channel data acquisition system; and structures such as low-pass, high-pass, band-pass, and band-stop filters that are configured to filter out unnecessary frequency components in the signal.

The filtering module is configured to perform bandpass filtering on the signal sample data by an AI signal transmission mechanism to obtain filtered data.

The filtered data is the signal sample data of a target frequency interval that reflects essential characteristics of the original signal after the noise is removed.

In some embodiments, the target frequency interval may be calculated based on an actual circuit requirement.

In some embodiments, the filtering module may include a bandpass filter composed of a transconductance amplifier and a capacitor, and is configured to perform bandpass filtering processing of a continuous time domain on the signal sample data by the bandpass filter to obtain filtered data.

In some embodiments, an expression for the filtered data may be:

$$V_{out1}(t) = G_m \cdot \frac{1}{C} \cdot \int_0^\tau V_{S1}(\tau) d\tau;$$

$$V_{out2}(t) = G_m \cdot \frac{1}{C} \cdot \int_0^\tau V_{S2}(\tau) d\tau;$$

wherein Vout represents first filtered data, $G_m$ represents an amplification factor of the transconductance amplifier, C represents a capacitance value in the bandpass filter, $V_{S1}$ represents first signal sample data, $\tau$ represents a current moment, t represents a sampling period, $V_{out2}$ represents second filtered data, and $V_{S2}$ represents second signal sample data.

The first filtered data is analog signal data obtained by filtering the first signal sample data.

The second filtered data is analog signal data obtained by filtering the second signal sample data.

In some embodiments, the signal obtaining module may include a capacitor inversion sample-and-hold circuit composed of a switch, a fully differential operational amplifier and a sampling capacitor, and the filtering module may include a Gm-C filter; and the switch is a high-level sampling switch controlled by control clocks $\varphi_1$, $\varphi_{1e}$, $\varphi_2$.

Figure 2:
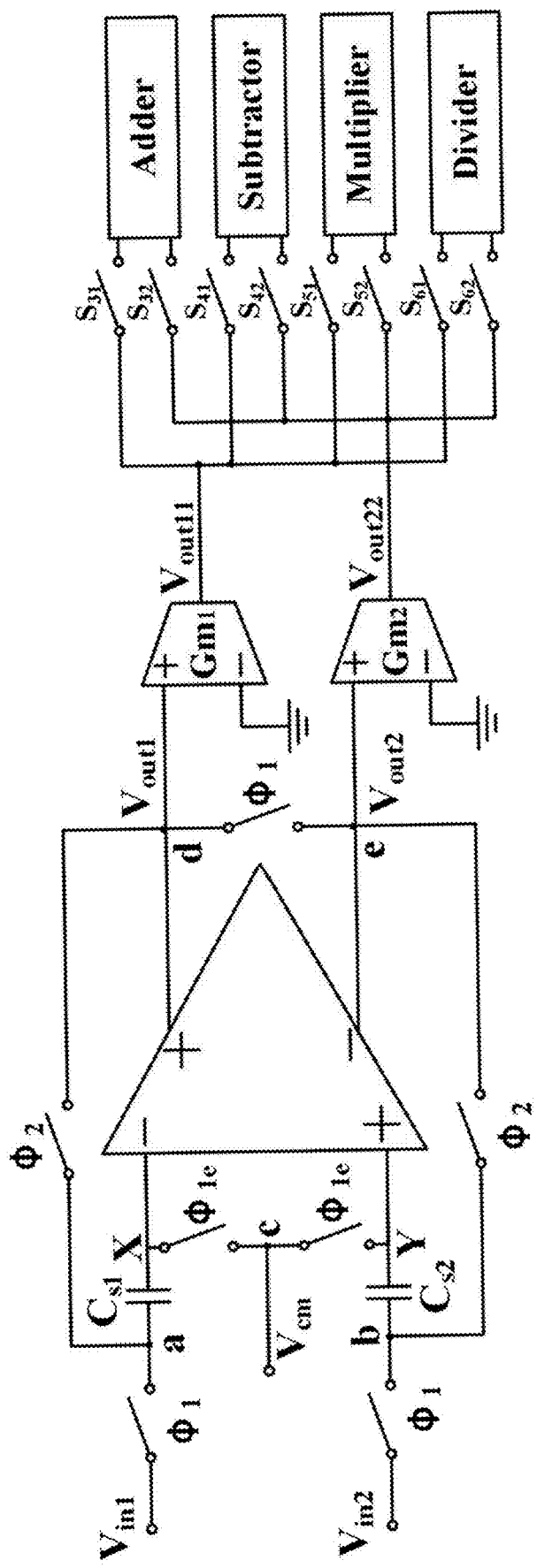
FIG. 2 is an exemplary schematic diagram of a working circuit of an analog AI computing architecture according to some embodiments of this specification.

In some embodiments, as shown in FIG. 2, the input first analog signal $V_{in1}$ and the input second analog signal $V_{in2}$ are respectively connected to terminals a and b of the sampling capacitor $C_{S1}$ and $C_{S2}$ through switches controlled by the control clock $\varphi_1$, and are connected to a positive output terminal and a negative output terminal of a fully differential operational amplifier through switches controlled by the control clock $\varphi_2$. Another end X of the sampling capacitor $C_{S1}$ is connected to the sampling capacitor $C_{S2}$ and a negative electrode of an input terminal of the fully differential operational amplifier, respectively. The sampling capacitor $C_{S1}$ and the sampling capacitor $C_{S2}$ are connected through two switches controlled by the control clock $\varphi_{1e}$. A node C between the two switches is connected to a mode voltage $V_{cm}$. Another end Y of the sampling capacitor $C_{S2}$ is connected to a positive electrode of an input terminal of the fully differential operational amplifier. The positive output terminal and the negative output terminal of the fully differential operational amplifier are connected through the switch controlled by the control clock $\varphi_1$. The positive output terminal and the negative output terminal of the fully differential operational amplifier are connected to the Gm-C filter.

In some embodiments, as shown in FIG. 2, the Gm-C filter may include a Gm1-C filter and a Gm2-C filter, wherein a positive input terminal of the Gm1-C filter is connected to a positive output terminal of the fully differential operational amplifier, a negative input terminal of the filter is grounded, and an output terminal of the filter is connected to four arithmetic units for addition, subtraction, multiplication, and division in the computing module by switches whose on-off states are controlled by external signals; and a positive input terminal of the Gm2-C filter is connected to a negative output terminal of the fully differential operational amplifier, a negative input terminal of the filter is grounded, and an output terminal of the filter is connected to four arithmetic units for addition, subtraction, multiplication, and division in the computing module by switches whose on-off states are controlled by external signals.

The working principle of the circuit is as follows: When clock signals $\varphi_1$ and $\varphi_{1e}$ are high and $\varphi_2$ is low, the circuit works in sampling mode. In this case, the charge $Q_x$ at node X and the charge $Q_y$ at node Y are:

$$Q_x=(V_{cm}-V_{in1})C_{S1};$$

$$Q_y=(V_{cm}-V_{in2})C_{S2};$$

When clock signals $\varphi_1$ and $\varphi_{1e}$ are low and $\varphi_2$ is high, the circuit works in holding mode. In this case, the sampling capacitors $C_{S1}$ and $C_{S2}$ are directly connected between the input and output, and the charge $Q_x$ at node X and $Q_y$ at node Y are:

$$Q_x=(V_x-V_{out1})C_S;$$

$$Q_y=(V_y-V_{out2})C_S;$$

$V_{out1}$ and $V_{out2}$ represent the voltage values of the positive and negative output terminals of the fully differential operational amplifier, respectively.

Assuming the op-amp is ideal, the voltage $V_x$ at node X is equal to the voltage $V_y$ at node Y, and the following may be obtained according to the law of charge conservation:

$$V_{out1}-V_{out2}=V_{in1}-V_{in2};$$

Therefore, according to the embodiment of this scheme, the signal receiving process of the neuron dendrite is referenced, that is, the dendrite in the neuron receives the signal from other neurons and converts the signal into potential changes, and the sampling and holding function of the input signal is completed within one clock cycle using a capacitor inversion sample-and-hold circuit; the signal filtering and integration mechanism of neurons in the brain is referenced, that is, in the brain, neurons integrate signals from a plurality of sources through synapses and filter the signals according to the strength and timing of the signal to produce an appropriate response. After being sampled and held, the to-be-input analog signal enters the Gm-C filter. The Gm-C filter achieves a filtering function by using a transconductance amplifier (Gm) and a capacitor (C) and performs continuous time domain processing on the input signals.

The computing module is configured to perform analog AI computing on the filtered data by an arithmetic unit and an external control switch to obtain a processed analog signal.

The arithmetic unit is a circuit arithmetic structure configured to calculate the analog signal and obtain the analog signal. For example, the arithmetic unit may include an adder, a subtractor, a multiplier and a divider.

The external control switch is a switch configured control a connection relationship between the filtering module and the arithmetic unit.

The processed analog signal is an analog signal that meets the requirements of subsequent circuit identification.

In some embodiments, the processed analog signal may be configured to input other circuitry for subsequent identification and processing.

In some embodiments, the computing module may include an arithmetic unit and a control switch array and is configured to compute the filtered data to obtain a processed analog signal.

The control switch array is configured to analyze the filtered data and input the filtered data into a corresponding operational amplifier for operation by an external control switch.

In some embodiments, the computing module may input the analog signal into the arithmetic unit for computation by using a control switch array.

The arithmetic unit is configured to calculate the filtered data to obtain a processed analog signal.

In some embodiments, the arithmetic unit of the computing module may further include a function generator, an integrator, a differentiator, a logarithmic and exponential arithmetic unit or the like for generating an analog signal of a particular functional waveform, such as a sine wave or an exponential waveform.

In some embodiments, as shown in FIG. 2, one end of the external control switches $S_{31}$, $S_{41}$, $S_{51}$ and $S_{61}$ of the computing module may be connected to an output terminal of the Gm1-C filter, one end of the external control switches $S_{32}$, $S_{42}$, $S_{52}$ and $S_{62}$ of the computing module may be connected to an output terminal of the Gm2-C filter, the external control switches $S_{31}$ and $S_{32}$ are connected to an adder, the external control switches $S_{41}$ and $S_{42}$ are connected to a subtractor, the external control switches $S_{51}$ and $S_{52}$ are connected to a multiplier, and the external control switches $S_{61}$ and $S_{62}$ are connected to a divider.

The working principle of the circuit is as follows: The filtered signal enters a corresponding analog computing unit according to the control of the control switch array, such as the adder connected to $S_{31}$ and $S_{32}$ whose switches are controlled by external signals, or the subtractor connected to $S_{41}$ and $S_{42}$ whose switches are controlled by external signals, or the multiplier connected to $S_{51}$ and $S_{52}$ whose switches are controlled by external signals, or the divider connected to $S_{61}$ and $S_{62}$ whose switches are controlled by external signals to perform corresponding operations:

$$V_{sum}(t) = V_{out1}(t) + V_{out2}(t);$$

$$V_{diff}(t) = V_{out1} - V_{out2}(t);$$

$$V_{prod}(t) = V_{out1}(t) \times V_{out2}(t);$$

$$V_{quotient}(t) = \frac{V_{out1}(t)}{V_{out2}(t)};$$

wherein $V_{sum}$ represents an output analog signal of addition operation, $V_{diff}$ represents an output analog signal of subtraction operation, prod represents an output analog signal of multiplication operation, and $V_{quotient}$ represents an output analog signal of division operation.

The analog divider may include an inverting proportional operational amplifier, and the output analog signal of the division operation may be expressed as:

$$V_{quotient}(t) = -\frac{R_f}{R_{in}} \cdot V_{out1}(t) \cdot V_{out2}(t);$$

wherein $R_f$ represents feedback resistance, $R_{in}$ represents input resistance, and the output analog signal $V_{quotient}$ of the division operation is the negative ratio of the product of the two input signals.

In some embodiments of this specification, the analog AI computing architecture consists of a signal obtaining module, a filtering module and a computing module, and a processed analog signal is obtained by sampling, filtering and analog AI computation on the analog signal. Through highly parallel and analog processing, the more complex processing in the digital signal processing field may be transformed into a result of direct processing in a simpler analog domain, which reduces the distortion and delay that may occur in the analog signal conversion process, and improves the real-time performance and response speed of the system. The digital signal processor and other related digital circuits are omitted, and the high-energy-efficiency process of neurons transmitting signals through synapses in the human brain is referenced, which simplifies the system architecture and reduces power consumption.

What is claimed is:

1. An analog AI computing architecture, comprising:
a signal obtaining module, configured to sample an analog signal to obtain signal sample data; wherein the signal obtaining module comprises a sample-and-hold circuit composed of a fully differential operational amplifier and a sampling capacitor;
the fully differential operational amplifier is configured to sample an input analog signal and store an obtained sample charge in the sampling capacitor; an expression of the sample charge is:

$$q_{S1}(\phi_1) = C_S \cdot V_{in1}(\phi_1);$$

$$q_{S2}(\phi_1) = C_S \cdot V_{in2}(\phi_1);$$

wherein $q_{S1}$ represents a first sample charge, $C_S$ represents a sampling capacitance, $V_{in1}$ represents an input first analog signal, $\phi_1$ represents a control clock, $q_{S2}$ represents a second sample charge, and $V_{in2}$ represents an input second analog signal;
the sampling capacitor is configured to perform form conversion on the sample charge to obtain the signal sample data; an expression of the signal sample data is:

$$V_{S1}(t) = \frac{q_{S1}(\phi_1)}{C_S} = V_{in1}(\phi_1);$$

$$V_{S2}(t) = \frac{q_{S2}(\phi_1)}{C_S} = V_{in2}(\phi_1);$$

wherein $V_{S1}$ represents first signal sample data, $q_{S1}$ represents the first sample charge, $C_S$ represents the sampling capacitance, $V_{in1}$ represents the input first analog signal, $\phi_1$ represents the control clock, t represents a sampling period, $V_{S2}$ represents second signal sample data, $q_{S2}$ represents the second sample charge, and $V_{in2}$ represents the input second analog signal;
a filtering module, configured to perform bandpass filtering on the signal sample data by an AI signal transmission mechanism to obtain filtered data; wherein the filtering module comprises a bandpass filter composed of a transconductance amplifier and a capacitor;
according to the filtering module, receive signals and convert the signals into potential changes, capacitor inversion sampling is performed within one clock cycle, and the signal sample data is subjected to bandpass filtering processing of a continuous time domain using the bandpass filter to obtain the filtered data:

$$V_{out1}(t) = G_m \cdot \frac{1}{C} \cdot \int_0^t V_{S1}(\tau) d\tau;$$

$$V_{out2}(t) = G_m \cdot \frac{1}{C} \cdot \int_0^t V_{S2}(\tau) d\tau;$$

wherein $V_{out1}$ represents first filtered data, $G_m$ represents an amplification factor of the transconductance amplifier, C represents a capacitance value in the bandpass filter, $V_{S1}$ represents the first signal sample data, $\tau$ represents a current moment, t represents the sampling period, $V_{out2}$ represents second filtered data, and $V_{S2}$ represents the second signal sample data; and a computing module, configured to compute the filtered data by an arithmetic unit and an external control switch to obtain a processed analog signal.

2. The analog AI computing architecture according to claim 1, wherein the computing module comprises the arithmetic unit and a control switch array;

the control switch array is configured to analyze the filtered data and input the filtered data into a corresponding operational amplifier for operation by the external control switch; and the arithmetic unit is configured to calculate the filtered data to obtain the processed analog signal.

\* \* \* \* \*